Aug. 27, 1940.  W. R. ROBINSON  2,213,074
GAS GENERATOR
Filed May 16, 1939
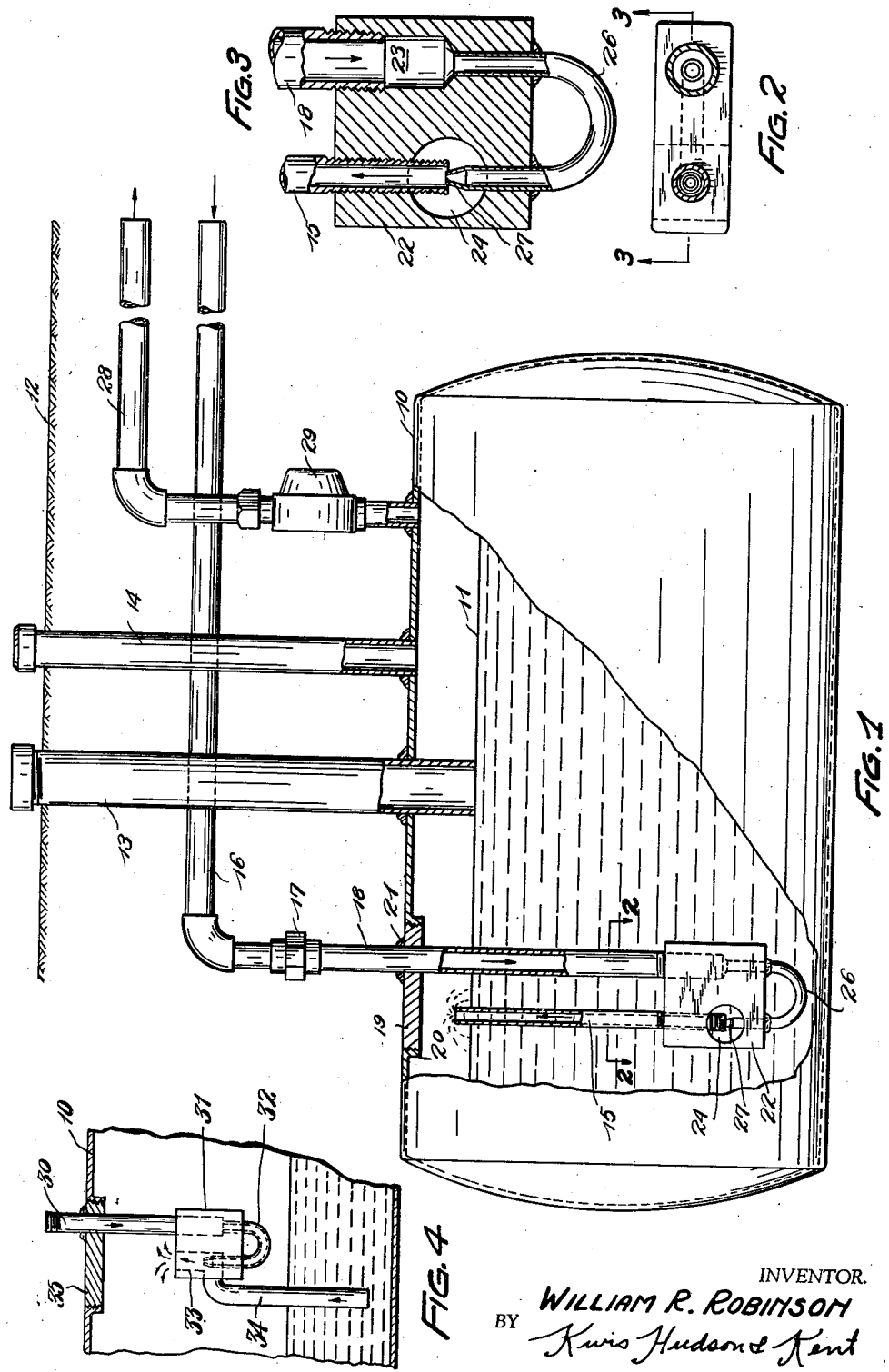
INVENTOR.
WILLIAM R. ROBINSON
BY Kuris Hudson & Kent
ATTORNEYS Patented Aug. 27, 1940

2,213,074

UNITED STATES PATENT OFFICE 2,213,074

GAS GENERATOR

William R. Robinson, Niles, Ohio

Application May 16, 1939, Serial No. 273,955

2 Claims. (Cl. 261—76)

This invention relates to gas generators of the type wherein a combustible gas is generated by passing a stream of air through a body of high test gasoline such as pentane, or other suitable volatile hydrocarbon, so that in passing through the latter the stream of air will vaporize and carry with it a sufficient amount of fuel to produce a mixture of considerable heat value.

More particularly the invention relates to a form of generator wherein there is povided a generating tube, generally in upright position and sometimes arranged interiorly and sometimes exteriorly of the tank for the liquid fuel, this tube communicating at or near its lower end with the liquid fuel and adapted to discharge at its upper end the excess fuel which passes upwardly therethrough, and also the mixture of air and vaporized fuel. Air is supplied under substantial pressure to the tube at or near its lower end and is directed upwardly therethrough at considerable velocity, thereby causing a continuous flow of air and fuel through the tube as long as the generator is in operation, with the result that the unvaporized or excess liquid fuel spills out of the upper end of the tube and passes to the body of liquid fuel in the tank while the gas that is generated in passing upwardly through the tube is delivered into the upper portion of the tank from which it can be drawn off for consumption purposes.

It has been found that with a generator of this type or form the gas which is generated in the tube has a tendency to cool the tube, apparently due to the latent heat of vaporization. In some installations the cooling of the tube reaches serious proportions, notwithstanding the constant flow upwardly through the tube of an excess amount of the liquid fuel, with the result that the temperature is so lowered as to reduce the efficiency of the generator and at times to stop the generation of gas entirely. This is the case particularly if the tube or the major portion of it is arranged exteriorly of the liquid fuel tank or container, for in installations of this kind the absorption of heat is so great that at times the tube becomes heavily frosted on the exterior with the result above mentioned.

The principal object of the present invention is to provide a generator of this type or form which at all times functions satisfactorily and with a high degree of efficiency regardless of the fuel level in the tank.

A further object is to avoid entirely, or at least reduce to a minimum, the cooling effect on the tube and at the same time provide a construction wherein the generating tube and the air supply piping are arranged within the container for the liquid fuel in a manner such that it constitutes a more or less self-contained unit, removable as such from the container for cleaning, repairs or any other purpose.

The above objects are attained very effectively by the present invention which may be here briefly described as consisting in certain novel details of construction and combinations and arrangements of parts which will be described in the specification and set forth in the appended claims.

In the accompanying sheet of drawings,

Fig. 1 is a side view of a gas generator formed in accordance with my invention, parts being broken away so as to show the construction and arrangement on the interior of the container for the liquid fuel;

Fig. 2 is a horizontal sectional view substantially along the line 2—2 of Fig. 1;

Fig. 3 is a vertical sectional view substantially along the line 3—3 of Fig. 2; and Fig. 4 is a fragmentary sectional view corresponding to the left-hand position of Fig. 1 but showing a modification.

Referring now to the drawing, 10 represents the container for the liquid fuel which is indicated at 11, this container being generally in the form of a tank which, from a safety standpoint, may be and generally is located a suitable distance under the ground, the ground level being indicated at 12. The fuel 11 may be supplied to the tank through a filling or supply pipe 13 which extends from a point above the ground level 12 into the tank, as indicated, and the tank may be provided also with a suitable gauge or level indicating tube 14, this part or feature being immaterial to the present invention and being indicated only conventionally or diagrammatically.

The generating tube or carbureting tube is shown at 15, this tube being located in the tank and supported in vertical position with its lower open end near the bottom of the tank and its upper end preferably above the maximum level of the liquid fuel. At 16 is shown an air supply pipe which receives air at the desired pressure from a suitable compressor or other source (not indicated). The air supply pipe 16 is connected by a quick-detachable coupling 17 to a vertical delivery section 18 which delivers air into the tank.

It is a feature of the present invention that the air delivery section 18, the generating tube 15, and the aspirator, ejector or jet device which causes the air to be discharged at high velocity into the lower end of the tube 15 so as to induce a flow of liquid fuel upwardly through the tube are formed into a unit which can be conveniently removed through the top of the tank if for any reason its removal becomes important for inspection, cleaning, or repairs. This is accomplished in the following manner: It will be noted that I provide in the top of the tank 10 a removable plug 19 which preferably is threaded into a flange 20 formed in the top of the tank, and the air delivery section 18 passes through this plug and is secured thereto preferably by welding, indicated at 21, thus providing a joint which is good mechanically and forming a seal which insures against leakage.

The generating or carbureting tube 15 is supported by the air delivery pipe 18 and between the lower end of the pipe 18 and the lower end of the tube 15 is provided the aspirator or jet device for inducing the flow of liquid fuel upwardly through the tube 15 and for convenience termed the ejector. This ejector may be formed in many different ways, and the invention is not to be limited to the details of the device herein illustrated.

In the construction illustrated, the lower end of the air delivery pipe 18 is secured to a block 22 in any suitable manner. In this instance the lower end of the tube is threaded and is screwed into the internally threaded upper portion of a passageway 23 which is formed in the block. In a similar manner the lower end of the generating tube 15 is secured to the block, and its lower end is located at about the center of an opening 24 extending transversely through the block from side to side thereof so that the liquid fuel may flow inwardly to the lower end of the tube 15. It is desired that the air which is supplied by pipe 18 be delivered at high velocity into the lower end of the generator tube 15, and this is accomplished by a U-shaped pipe 26 both ends of which extend up into the bottom of the block 22 and are secured in the latter. The end of one leg of the U-tube 26 communicates with the lower end of the chamber or passageway 23 to which air is supplied by pipe 18. The end of the other leg of the U-tube 26 is conically shaped, as shown at 27, forming the equivalent of a nozzle with a reduced orifice located at the lower end of the tube 15 in the transverse opening 24, as clearly shown in Figs. 1 and 3.

In practice, the velocity of the air which is discharged from the nozzle 27 into the generating tube 15 is such as to cause an upward flow of liquid fuel through the generating tube 15. A considerable excess of liquid fuel passes upwardly through the tube, and this fact, together with the fact also that the tube is located in the body of liquid fuel, prevents the tube cooling sufficiently to adversely affect the generator. The excess fuel spills out of the upper end of the tube 15 and the gas which is generated in the tube passes to the upper portion of the tank above the level of the liquid fuel. From here it may be withdrawn by a gas delivery pipe 28 which extends into the top of tank 10 and may be provided with a pressure regulator indicated conventionally at 29.

It will be noted that the generating tube 15, the ejector, and the air delivery pipe 18 form a self-contained unit. The relative sizes of the plug 19 and of this unit are such that when the air delivery pipe is disconnected from the air supply pipe 16 at the coupling 17, this whole unit can be removed from the tank as one part, thus making it very convenient to obtain access to and to remove the only part of the generator which may from time to time require attention, cleaning, or repairing.

The advantages of the removable self-contained unit can be attained with constructions differing substantially from that illustrated in Figs. 1, 2, and 3, and may be used to advantage even though the mixer or generating tube or carburetor is not immersed in the liquid fuel. For example, in Fig. 4 the unit includes an air delivery pipe 30 corresponding to the air delivery pipe 18 of the first described construction, and this delivery pipe is connected to a mixing or carbureting chamber which may be in the form of a block 31 which in this instance is located above the body of liquid fuel. The air is delivered by way of a U-shaped jet tube 32 to the lower end of an upright mixing or generating passageway 33 which in this instance is formed in the block 31, the air being discharged at considerable velocity by a nozzle at the end of the tube 32 adjacent the lower end of the passageway 33. Liquid fuel is delivered to the lower end of the passageway 33 by a suction pipe 34 which at its upper end communicates with the lower end of the passageway 33 and extends downwardly into the liquid fuel or toward the bottom of the tank, as illustrated.

The construction illustrated in Fig. 4 functions in precisely the same way as that illustrated in the preceding figures, the air being directed upwardly through the passageway 33 at sufficient velocity to cause an upward flow of liquid fuel therethrough, and the vaporization and mixing occur in this passageway, the excess fuel and the generated gas passing out through the top of the passageway. It will be understood that the air delivery pipe 30 will be connected by a quick detachable coupling with the air supply pipe extending from the compressor, and that this delivery pipe 30 will be connected as before to a removable plug 35 suitably fitted into the top of the tank 10 so that it and the unit carried by it can be removed from the tank when necessary.

Thus it will be seen that the above objects are attained very effectively by my invention. While I have shown two forms of the invention, I do not desire to be confined to the precise details shown but aim in my claims to cover all modifications which do not depart from the spirit and scope of the invention.

Having thus described my invention, I claim:

1. In a gas generator, a tank for liquid fuel having an aperture in the upper part thereof, a member removably secured to said tank so as to close said aperture, an air delivery pipe supported by said member and having a discharge nozzle, a gas generating member having a fuel inlet and a passageway for the delivery of fuel and air, said inlet communicating with said passageway and arranged adjacent to the delivery end of said nozzle and the latter being arranged to discharge air past said inlet and into said passageway whereby said passageway is caused to deliver a mixture of fuel and air to a point above the fuel body in the tank, and an outlet pipe for gaseous fuel extending from the upper part of the tank, said air delivery pipe, nozzle, and generating member constituting a unit removable through said aperture.

2. In a gas generator, a tank for liquid fuel having an aperture in the upper part thereof, a member removably secured to said tank so as to close said aperture, an air delivery pipe supported by said member and having a discharge nozzle normally beneath the surface of the liquid fuel, a gas generating pipe substantially parallel with and adjacent to said air delivery pipe with entrance for fuel and air spaced slightly from the delivery end of said nozzle and adapted to carry a mixture of air and fuel to a point above the fuel body in the tank, and an outlet pipe for gaseous fuel extending from the upper part of the tank, said air delivery pipe, nozzle, and generating pipe constituting a unit removable through said aperture.

WILLIAM R. ROBINSON.